US007739161B1

(12) United States Patent
Stein

(10) Patent No.: US 7,739,161 B1
(45) Date of Patent: Jun. 15, 2010

(54) METHOD FOR USING INTERNET ACCESS NETWORKS THROUGH MOBILE INTERNET-COMPATIBLE MOBILE COMMUNICATION TERMINALS

(75) Inventor: Karl-Ulrich Stein, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/646,995

(22) PCT Filed: Mar. 22, 1999

(86) PCT No.: PCT/DE99/00816

§ 371 (c)(1), (2), (4) Date: Sep. 25, 2000

(87) PCT Pub. No.: WO99/49606

PCT Pub. Date: Sep. 30, 1999

(30) Foreign Application Priority Data

Mar. 24, 1998 (DE) ................ 198 12 924

(51) Int. Cl.
G06Q 40/00 (2006.01)
(52) U.S. Cl. .............. 705/35; 705/39; 705/40
(58) Field of Classification Search ........ 705/39, 705/40, 35, 36 R, 37, 38
See application file for complete search history.

(56) References Cited

U.S. PATENT DOCUMENTS

| 5,602,905 | A | * | 2/1997 | Mettke ............... 379/93.22 |
| 5,749,075 | A | * | 5/1998 | Toader et al. ......... 705/14 |
| 5,815,665 | A | * | 9/1998 | Teper et al. .......... 709/229 |
| 5,956,391 | A | * | 9/1999 | Melen et al. ......... 379/114.01 |
| 5,991,749 | A | * | 11/1999 | Morrill, Jr. .......... 705/44 |
| 6,029,151 | A | * | 2/2000 | Nikander ............. 705/39 |
| 6,142,369 | A | * | 11/2000 | Jonstromer .......... 235/380 |
| 6,486,862 | B1 | * | 11/2002 | Jacobsen et al. ...... 345/88 |

OTHER PUBLICATIONS

Internet: Paying the piper Just as millions outside the groves of academe discover the joys of free global communication on the Internet, radical change seems certain. Mike Holderness asks what comes next Mike Holderness. The Guardian (pre-1997 Fulltext). Manchester (UK): Jul. 14, 1994.*

Net Profits Providers, support services finding ways to make the Internet pay off; [Fifth Edition] Gina Smith. San Francisco Examiner. San Francisco, Calif.: Apr. 16, 1995. p. B.5.*

* cited by examiner

*Primary Examiner*—Lalita M Hamilton
(74) *Attorney, Agent, or Firm*—King & Spalding L.L.P.

(57) ABSTRACT

A commercial interface (SBB) is provide in each Internet access network (IN-AN) for carrying out cashless payments. When a mobile communication terminal (KE) asks for a link to be established, a traffic relationship is established towards the commercial interface (SBB). After a cashless payment has been made using the commercial interface (SBB), the Internet access network (IN-AN) can be used by the mobile communication terminal (KE). This method provides for an improved flexibility of use of the Internet access network (IN-AN).

14 Claims, 1 Drawing Sheet

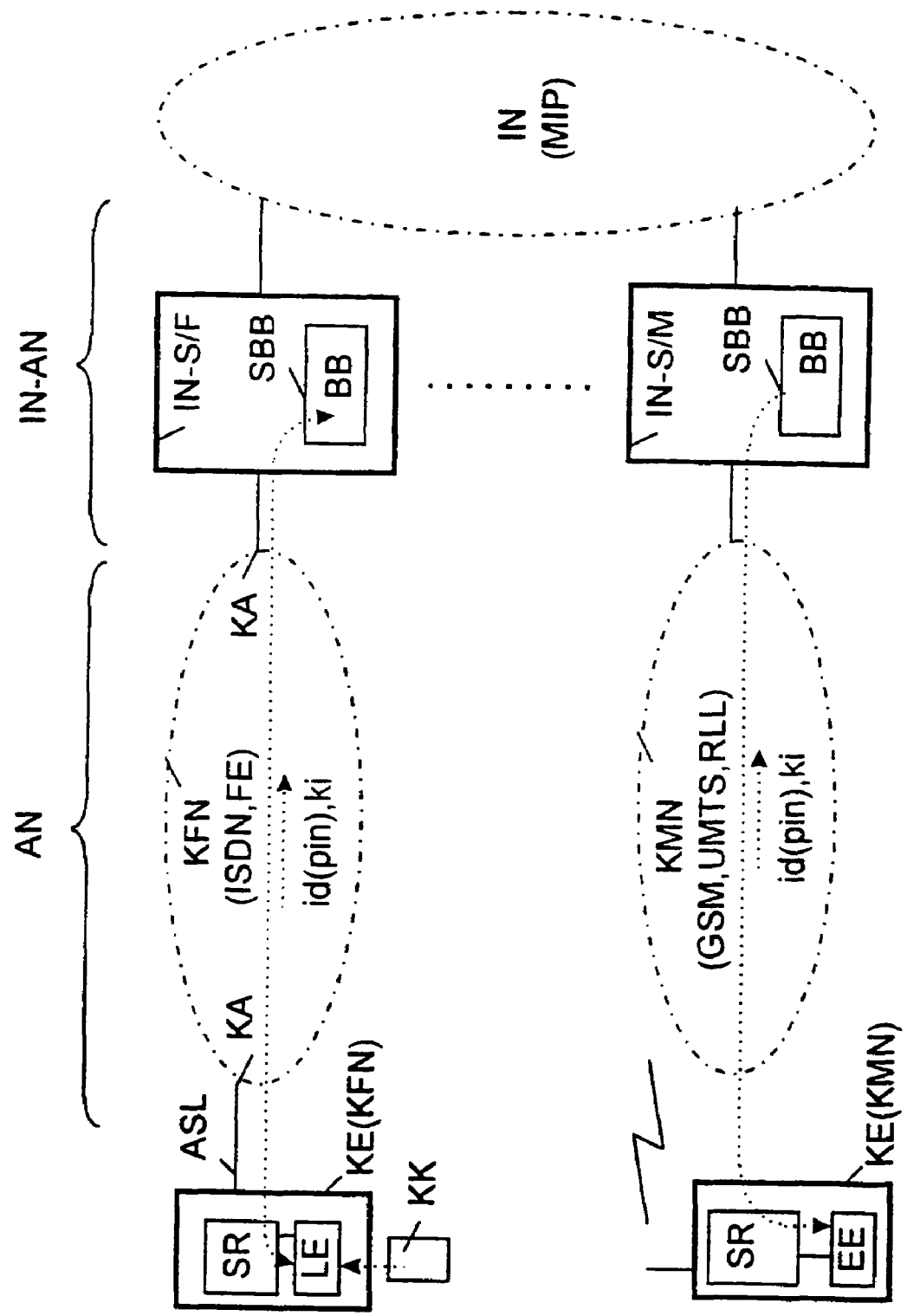

METHOD FOR USING INTERNET ACCESS NETWORKS THROUGH MOBILE INTERNET-COMPATIBLE MOBILE COMMUNICATION TERMINALS

BACKGROUND OF THE INVENTION

1. Field of the Invention

The invention relates to a method for using various Internet access networks with mobile, Internet-compatible communication terminal devices, for carrying out cashless payments.

2. Description of the Related Art

The Internet communication network represents a global overlay communication network in which Internet access networks or Internet servers are connected via public and private communication networks. Access to the Internet ensues mainly via subscriber line areas or feeder networks of public or private communication fixed networks (e.g., the telephone network of the ISDN communication network). Alternatively, access is provided via communication radio networks (e.g., the public mobile radiotelephone network or a wireless network working according to the DECT or CDMA transmission method). Since the Internet access networks or Internet servers are regionally or super-regionally operated, the respective Internet user or the user's Internet communication terminal device must be logged on at the respective Internet server or Internet operator. This registration is required for a charge registration for Internet services. This means that the respective Internet access networks can only be used by the logged-on or registered Internet users or their communication terminal devices in the respective region or can only be reached via expensive, narrowband connections via the worldwide telephone network.

A mobile Internet protocol is being currently designed for Internet users in which mobile Internet communication terminal devices are allowed to have worldwide access to the Internet by different Internet access networks or different Internet operators. This service of the mobile Internet permits a mobile, global utilization of the Internet.

European patent document EP 0 765 068 A2 discloses a method for payment of an Internet use in which the respective Internet can be used given a use of many and different Internet service providers after a request by the Internet and a transmission of the credit card number.

International patent document WO 97/41586 discloses a method for the connection of a user to the Internet in which the user cannot directly access the Internet but rather access it via a further Internet service provider. To this end, specific logon and check procedures are provided at the further Internet service provider that represent the basis for the usage time and the charge registration.

International patent document WO 97/14118 discloses a computer network in which geographically distributed computers access the Internet via a central server. The computers can communicate with the server via different communication networks that permits a communication after an authorization procedure and a payment for the use of the server.

SUMMARY OF THE INVENTION

The object underlying the invention is comprised in fashioning the Internet access networks such that these can be used by arbitrary, mobile communication terminal devices.

This object is achieved by a method for using various Internet access networks with mobile Internet-compatible communication terminal devices, comprising the steps of providing, in the Internet access networks, at least one respective interface for a cash-free payment for a use of one of the respective Internet access networks which is a respective Internet access network; setting up a traffic relationship to the at least one respective interface in a framework of a logon of a mobile communication terminal device in the respective Internet access network; and using the respective Internet access network one of the mobile communication terminal devices which is a communication terminal device after the cash-free payment via the at least one respective interface that is effected by the communication terminal device.

The critical aspect of the inventive method is that it provides, in the Internet access networks, at least one interface for cash-free payment for a use of the respective Internet access network. A traffic relationship to the interface is set up within the framework of the log-on of a mobile communication terminal device in the respective Internet access network, and, following a cash-free payment via the interface effected by the communication terminal device, the respective Internet access network can be used by the mobile communication terminal device.

The critical advantage of the inventive method is that an Internet communication terminal device can both be registered as well as implement a cash-free payment for the Internet access with the assistance of the interface. The registration at an Internet access network with the assistance of a mobile Internet protocol additionally permits an Internet user to be reached worldwide. A further advantage is the local realization of the interface in the Internet access network, since the information exchange with respect to the cash-free payment is limited to the Internet access network, i.e., it does not ensue via the Internet itself, and, thus avoids a global communication of confidential information or data transmitted given cash-free payment.

The cash-free payment ensues especially advantageously with the assistance of a credit card; credit card information and personal identification information are communicated to the interface via the communication terminal device and via the Internet access network. Alternatively, other cards or an input of the credit card information at an input device are also possible, which permits a cash-free payment with the interface of the respective Internet access network. A reader is adapted to the cards employed. Alternatively, a uniform input device (e.g., a numerical or alphanumerical keyboard) can be provided for the input of the personal identification and the credit card information.

According to a further development of the inventive method, an electronic signature is communicated from the affected communication terminal device to the interface in the framework of a security system and/or the identification and credit card information to be communicated is encrypted individually associated to the communication terminal devices.

Further advantageous developments of the inventive method can be derived from the details presented below.

DESCRIPTION OF THE DRAWING

The inventive method is explained in greater detail below with reference to a drawing, which is a block diagram illustrating the components and relationships involved in the inventive method.

DETAILED DESCRIPTION OF THE INVENTION

The drawing shows a block circuit diagram of an arrangement of communication networks for which the inventive method is provided. The global Internet IN is connected to Internet servers IN-S that control the access to the Internet IN. For example, two Internet servers IN-S are shown: one Internet server IN-S/F is connected to a communication fixed network KFN; and a further Internet server IN-S/M is connected to a communication radio network KMN. The communication fixed network KFN is realized, for example, by a service-integrating communication network ISDN or by a telephone communication network FE. Communication fixed network-individual communication terminal devices KE (KFN) are connected to this communication fixed network KFN via subscriber lines ASL.

The communication radio network KMN can, for example, be realized by an existing mobile radio telephone network GSM or by future mobile radio telephone networks UMTS according to a future UMTS standard for mobile radio telephone networks. Further communication radio networks KMN are fashioned, for example, according to a DECT or CDMA standard or a TD-CDMA standard RLL. Mobile radio telephone network-individual communication terminal devices KE (KMN) are wirelessly connected to the communication network KMN.

The exemplary embodiment assumes that the communication terminal devices KE (KFN), KE (KMN) connected to the communication fixed network KFN and to the communication radio network KMN are Internet-compatible, i.e., they are equipped with the circuit-oriented and program-oriented mechanisms for a communication with the Internet IN. This means that the communication terminal devices KE represent a processor-controlled device—particularly a personal computer—that exhibits a picture screen display and a keyboard.

It is also assumed that the communication terminal devices KE (KFN), KE (KMN) represent communication terminal devices KE that can be utilized at different geographical locations. This means that the communication terminal device KE (KFN)—particularly a portable personal computer with an ISDN interface—can be connected to a communication fixed network KFN at different communication terminals KA. The inventive method can also be employed given a fixed connection of a communication terminal device KE (KFN) to a communication network KFN.

The Internet IN must be correspondingly fashioned as a pre-requisite for the mobility of the communication terminal devices KE, i.e., a mobile Internet protocol MIP is implemented in the Internet IN that assists the realization of a service for the connection of mobile communication terminal devices KE.

The inventive communication terminal devices KE (KFN) KE (KMN), furthermore, are respectively equipped with an input EE—shown by way of example in the communication terminal device KE for communication radio networks (KMN)—or a reader LE into which a credit card KK can be inserted—indicated by a dot-dash arrow. With the assistance of the input EE, the credit card information ki stored in a credit card KK as well as the identification information id, i.e., the personal identification pin, can be input by an Internet user.

The communication fixed network KFN and the communication radio network KMN respectively form feeder networks AN for the Internet access network IN-AN or the Internet IN.

After a wireless or wire-bound connection of a mobile communication terminal device KE (KFN, KMN), a log-on procedure is implemented in the respective communication network KFN, KMN. Such a log-on procedure can, for example, be implemented with the corresponding communication terminal device identification (not shown) which uses different identifications for the communication fixed network KFN and the communication radio network KMN. Subsequently, a connection from the respective communication terminal device KE (KFN, KMN) is setup to the allocated Internet server IN-S/F, IN-S/M. The setup of the connection and the log-on procedure are implemented in the communication terminal devices with the assistance of a signaling routine SR.

After the connection setup, the respective communication terminal device KE (KFN, KMN) in the respective Internet server IN-S is connected to an interface SBB for cash-free payment. The interface SBB is realized in software by an interface routine BB. As a result of a communication relationship between the reader SE or input EE or the signaling routine SR of the requesting communication terminal devices KE and the commercial interface SBB, identification information id (pin) and credit card information ki are communicated to the interface SBB. After a check of these communicated identification and credit card information id (pin), ki, the access to the Internet IN is enabled in the respective Internet server IN-S, i.e., the requesting communication terminal device KE can set up traffic relationships via the Internet to Internet-specific devices (not shown) or to other communication terminal devices KE.

The cash-free payment for an access to the Internet via the interface SBB can be provided both for a temporary use as well as for a longer or continuous use of the access to the Internet IN or the respective Internet server IN-S.

The wire-bound communication terminal devices can be alternatively connected via transmission devices in which transmission methods are used that do not influence the existing line technologies for, e.g., the integrated services communication network ISDN or the analog telephone network FE. Such transmission technologies are the standardized ADSL and x DSL transmission methods. No connections to the respective Internet server need to be setup, since these communication terminal devices are directly connected to the respective Internet server IN-S via the respective connection technology. A log-on or registration in the respective Internet server IN-S continues to be required.

The inventive method is not limited to the exemplary embodiment since the inventive method can also be realized given the greatest variety of public or private feeder networks AN to the respective Internet servers IN-S or Internet access networks IN-AN. The invention also considers a respective adaptation in view of the signaling and the protocols used. The above-described method is illustrative of the principles of the present invention. Numerous modifications and adaptations will be readily apparent to those skilled in this art without departing from the spirit and scope of the present invention.

What is claimed is:

1. A method for accessing an Internet access network with an Internet-compatible communication terminal device, comprising:

in the Internet access network, providing at least one respective interface for accessing the Internet access network;

prior to providing the Internet-compatible communication terminal device access to the Internet via the Internet access network:

setting up a communication relationship between the Internet-compatible communication terminal device and the respective interface via a non-Internet connection upon receiving an Internet-access-request from the Internet-compatible communication terminal device, the Internet-compatible communication terminal device and the respective interface for accessing the Internet access network having no pre-existing relationship; and effecting a cash-free payment from the communication terminal device to the respective interface, the payment not being made via the Internet; and after effecting the cash-free payment, using the communication relationship to grant the Internet-compatible communication terminal device access to the Internet via the Internet access network.

2. The method according to claim 1, further comprising providing and utilizing in said Internet access network a mobile Internet protocol for realizing a communication terminal device mobility.

3. The method according to claim 1, further comprising communicating, to said at least one respective interface via said communication terminal device and via said respective Internet access network, credit card information and at least one of an identifier and a personal identifier that assists said cash-free payment.

4. The method according to claim 3, further comprising reading said credit card information in said mobile communication terminal devices with assistance of reader devices for credit cards or input devices.

5. The method according to claim 3, further comprising
encrypting, in communication terminal device-associated fashion, identifying information selected from the group consisting of said credit card information, said identifier and said personal identifier; and
communicating said identifying information to said at least one respective interface.

6. The method according to claim 1, further comprising communicating an electronic signature, in a framework of a security system of said cash-free payment, from an affected communication terminal device to said at least one respective interface.

7. The method according to claim 1, further comprising representing said mobile communication terminal devices by communication radio network communication terminal devices; and
representing an Internet access network by at least one Internet server connected to a communication radio network.

8. The method according to claim 7, further comprising integrating or arranging said at least one respective interface in said at least one Internet server.

9. The method according to claim 1, further comprising:
representing said mobile communication terminal devices by portable communication fixed network communication terminal devices; and representing an Internet access network by at least one Internet server connected to a communication fixed network.

10. The method according to claim 9, further comprising integrating or arranging said at least one respective interface in said at least one Internet server.

11. The method according to claim 1, further comprising connecting mobile computer devices to said mobile communication terminal devices, wherein said cash-free payment is implemented utilizing said mobile communication terminal devices.

12. The method according to claim 1, further comprising
setting up a connection to one of said Internet access networks via feeder networks of public or private communication fixed networks or communication radio networks;
producing a traffic relationship to said at least one respective interface in a framework of a logon of a mobile communication terminal device in said respective Internet access network;
communicating an identification and credit card information between a requesting communication terminal device and at least one respective interface in a framework of a payment procedure for cash-free payment; and
subsequently granting access to the Internet via said respective Internet access network to said requesting communication terminal device.

13. A method for accessing an Internet access network with an Internet-compatible communication terminal device, comprising the steps:
in the Internet access network which provides access to the Internet, providing at least one respective interface for accessing the Internet access network by the Internet compatible communication terminal device;
prior to providing the Internet-compatible communication terminal device access to the Internet via the Internet access network:
setting up a communication relationship between the Internet-compatible communication terminal device and the respective interface via a non-Internet connection upon an Internet-access-request of the Internet-compatible communication terminal device; and
effecting a cash-free payment from the communication terminal device to the respective interface, the payment not being made via the Internet; and
after effecting the cash-free payment, using the communication relationship to grant the Internet-compatible communication terminal device access to the Internet via the Internet access network.

14. A method for establishing Internet access for an Internet-compatible communication terminal device not having Internet access, comprising negotiating access to the Internet via an interface of an Internet access network by the Internet compatible communication terminal device through the following steps:
transmitting an Internet-access-request by the Internet compatible communication terminal device to said Internet access network interface;
setting up a communication relationship between the Internet access network interface and the Internet-compatible communication terminal device via a non-Internet connection; and
using the communication relationship to establish Internet access for the Internet compatible communication terminal device via the Internet access network after effecting a cash-free payment from the communication terminal device to the interface, the cash-free payment not effected via the Internet.

* * * * *